(12) United States Patent
Busayapongchai et al.

(10) Patent No.: US 6,751,595 B2
(45) Date of Patent: Jun. 15, 2004

(54) MULTI-STAGE LARGE VOCABULARY SPEECH RECOGNITION SYSTEM AND METHOD

(75) Inventors: Senis Busayapongchai, Tucker, GA (US); Pichet Chintrakulchai, Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/852,180

(22) Filed: May 9, 2001

(65) Prior Publication Data

US 2002/0169600 A1 Nov. 14, 2002

(51) Int. Cl.[7] .............................................. G01L 15/00
(52) U.S. Cl. ...................... 704/275; 704/270; 704/251; 379/88.03
(58) Field of Search ................................ 704/251, 275, 704/270; 379/88.03

(56) References Cited

U.S. PATENT DOCUMENTS

| | | | | |
|---|---|---|---|---|
| 5,797,116 A | * | 8/1998 | Yamada et al. ............... | 704/10 |
| 5,839,106 A | | 11/1998 | Bellegarda .................. | 704/257 |
| 5,905,773 A | * | 5/1999 | Wong ....................... | 379/88.03 |
| 5,960,394 A | | 9/1999 | Gould et al. ................ | 704/240 |
| 5,987,414 A | * | 11/1999 | Sabourin et al. ............ | 704/270 |
| 6,018,708 A | | 1/2000 | Dahan et al. ............... | 704/244 |
| 6,092,045 A | | 7/2000 | Stubley et al. ............. | 704/254 |
| 6,122,361 A | | 9/2000 | Gupta ....................... | 379/223 |
| 6,173,266 B1 | | 1/2001 | Marx et al. ................. | 704/270 |
| 6,195,635 B1 | * | 2/2001 | Wright ..................... | 704/231 |
| 2002/0065657 A1 | * | 5/2002 | Reding et al. .............. | 704/246 |

FOREIGN PATENT DOCUMENTS

WO    WO 97/37481    10/1997

\* cited by examiner

*Primary Examiner*—Susan McFadden
(74) *Attorney, Agent, or Firm*—Woodcock Washburn LLP

(57) ABSTRACT

Multiple processing stages are provided with different vocabulary databases to improve processing time, efficiency, and accuracy in speech recognition. The entire vocabulary is divided into smaller vocabulary subsets, which are associated with particular keywords. A small vocabulary subset is generated or retrieved based on certain information, such as a calling party's locality. A user is prompted to provide input information, such as the locality in which a business whose phone number is requested is located, in the form of a spoken utterance to the system. If the utterance matches one of the entries in the initial small vocabulary subset, then the utterance is considered to be recognizable. If the utterance is not recognizable when compared to the initial small vocabulary subset, then the utterance is stored for later use. The user is then prompted for a keyword related to another subset of words in which his initial utterance may be found. A vocabulary subset associated with the received keyword is generated or retrieved. The initial stored utterance is then retrieved and compared to the newly loaded vocabulary subset. If the utterance matches one of the entries in the newly loaded vocabulary subset, then the utterance is recognizable. Otherwise, it is determined that the initial utterance was unrecognizable, and the user is prompted to repeat the initial utterance.

16 Claims, 3 Drawing Sheets

MULTI-STAGE LARGE VOCABULARY SPEECH RECOGNITION SYSTEM AND METHOD

FIELD OF THE INVENTION

The present invention relates in general to speech recognition and, more particularly, to interactive speech applications for use in automated assistance systems.

BACKGROUND OF THE INVENTION

Pattern recognition generally, and recognition of patterns in continuous signals such as speech signals, has been a rapidly developing field. A limitation in many applications has been the cost of providing sufficient processing power for the complex calculations often required. This is particularly the case in speech recognition, all the more so when real-time response is required, for example to enable automated directory inquiry assistance, or for control operations based on speech input. Information can be gathered from callers and/or provided to callers, and callers can be connected to appropriate parties within a telephone system. To simulate the speed of response of a human operator, and thus avoid a perception of "unnatural" delays, which can be disconcerting, the spoken input needs to be recognized very quickly after the end of the spoken input.

The computational load varies directly with the number of words or other elements of speech (also referred to as "orthographies"), which are modeled and held in a dictionary database, for comparison to the spoken input. The number of orthographies is also known as the size of vocabulary of the system. The computational load also varies according to the complexity of the models in the dictionary, and how the speech input is processed into a representation ready for the comparison to the models. Also, the actual algorithm for carrying out the comparison is a factor.

Numerous attempts have been made over many years to improve the trade off between computational load, accuracy of recognition, and speed of recognition. Depending on the size of vocabularies used, and the size of each model, both the memory requirements and the number of calculations required for each recognition decision may limit the speed/accuracy/cost trade off. For useable systems having a tolerable recognition accuracy, the computational demands are high. Despite continuous refinements to models, speech input representations, and recognition algorithms, and advances in processing hardware, there remains great demand to improve the above mentioned trade off, especially in large vocabulary systems, such as those having greater than 100,000 words.

SUMMARY OF THE INVENTION

The present invention is directed to a system and method for speech recognition using multiple processing stages that use different vocabulary databases to improve processing time, efficiency, and accuracy in speech recognition. The entire vocabulary is divided into smaller vocabulary subsets, which are associated with particular keywords. A small vocabulary subset is generated or retrieved based on certain information, such as a calling party's locality. A user is prompted to provide input information, such as the locality in which a business whose phone number is requested is located, in the form of a spoken utterance to the system. If the utterance matches one of the entries in the initial small vocabulary subset, then the utterance is considered to be recognizable. If the utterance is not recognizable when compared to the initial small vocabulary subset, then the utterance is stored for later use. The user is then prompted for a keyword related to another subset of words in which his initial utterance may be found. A vocabulary subset associated with the received keyword is generated or retrieved. The initial stored utterance is then retrieved and compared to the newly loaded vocabulary subset. If the utterance matches one of the entries in the newly loaded vocabulary subset, then the utterance is recognizable. Otherwise, it is determined that the initial utterance was unrecognizable, and the user is prompted to repeat the initial utterance.

The foregoing and other aspects of the present invention will become apparent from the following detailed description of the invention when considered in conjunction with the accompanying drawings.

DESCRIPTION OF EXEMPLARY EMBODIMENTS AND BEST MODE

Figure 1:
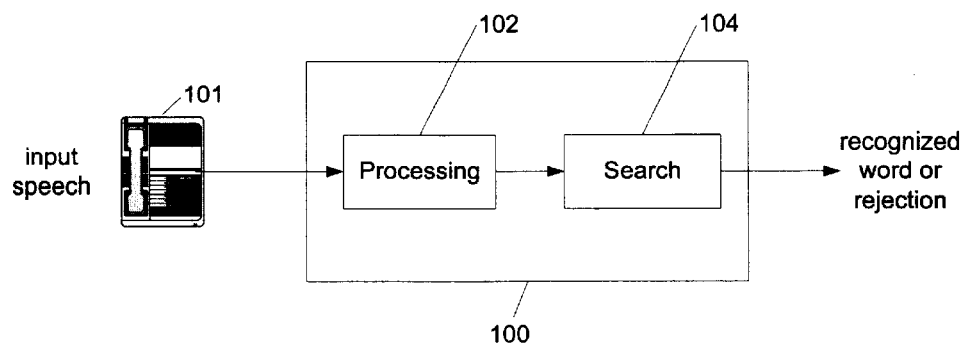
FIG. 1 shows a block diagram of a general speech recognition system.

Speech recognition systems have been developed in many parts of the world and, although it is difficult to describe a standard recognition system architecture, some characteristics are shared between many of them. A typical speech recognition system, of the type depicted in FIG. 1, generally comprises a device such as a microphone or telephone set 101 to convert a spoken utterance into an electric signal and transmit the signal to the speech recognition unit 100. The speech recognition unit 100 can be split into two functional blocks: a processing unit 102 and a search unit 104. The processing unit 102 is an acoustic processor that performs the segmentation, the normalization, and the parameterization of the input signal waveform. In some cases, especially for connected word speech, this stage may also include a feature extraction operation. The search unit 104 includes a speech recognition dictionary that is scored in order to find possible matches to the spoken utterance.

Figure 2:
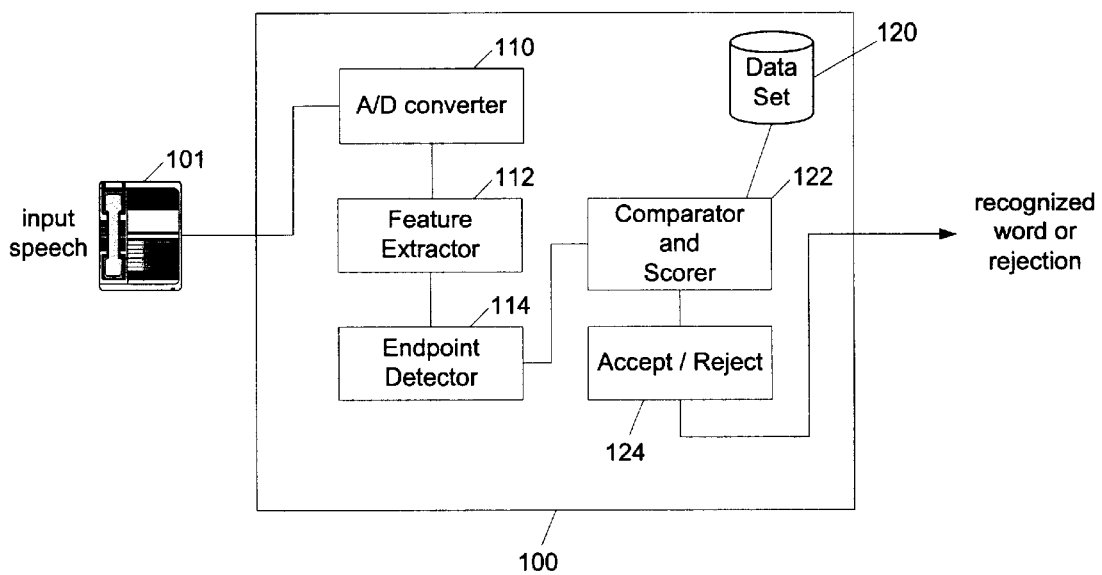
FIG. 2 shows a more detailed block diagram of the system of FIG. 1.

More specifically, the purpose of the processing unit 102, illustrated in greater detail in FIG. 2, is first to translate the incoming analog speech waveform into digital format. This can be done with the use of an A/D converter 110, a spectrogram generator or any other suitable technique. The input signal is then split into short segments called analysis frames whose typical duration ranges from 5–20 ms. All further processing will be done relative to these frames. The processing unit 102 further comprises a feature extractor 112, which can comprise a normalizer and a parameterizer, and an endpoint detector 114.

The normalizer adjusts the maximum signal amplitude of each analysis frame to a standard level in order to take into account variations in speech intensity, transmission losses and other physical effects such as distance from the microphone and recording level. The parameterizer typically represents speech frames in terms of voicing decision, amplitude and fundamental frequency. A wide variety of parameters can be used in the parameterization block.

The endpoint detector 114 splits the input signal waveform into a starting point and an endpoint of the speech utterance. This stage uses algorithms whose purpose is to locate the boundaries between silence and speech. Many systems use the short term energy and the zero crossing rate as an indication of the beginning or end of a word. Moreover, typical endpoint detection units use many parameters including frame energy, frame voice labels and other statistical variance parameters derived from speech.

The search functional unit 104, shown in more detail in FIG. 2, scores or otherwise ranks all the words (also known as "orthographies") in a speech recognition dictionary database 120 such as to be able to derive the orthography or orthographies which have the highest probability of matching the spoken utterance. A comparator and scorer 122 compares the spoken utterance with the entries in the database 120 to determine a match based on closest score. Typical algorithms that can be used include the fast score estimation and the graph search algorithms, as known by those skilled in the art.

The accept/reject stage 124 compares the score to a predetermined threshold to determine if a correct mapping was found or if no mapping could be determined. If the score is greater than or equal to the predetermined threshold, then it is determined that a correct mapping has been found and the recognized word is provided as output, generally to another part of the system which may use the output as a link to information. If the score is below the threshold, no match is found and the input spoken utterance is rejected.

Figure 3:
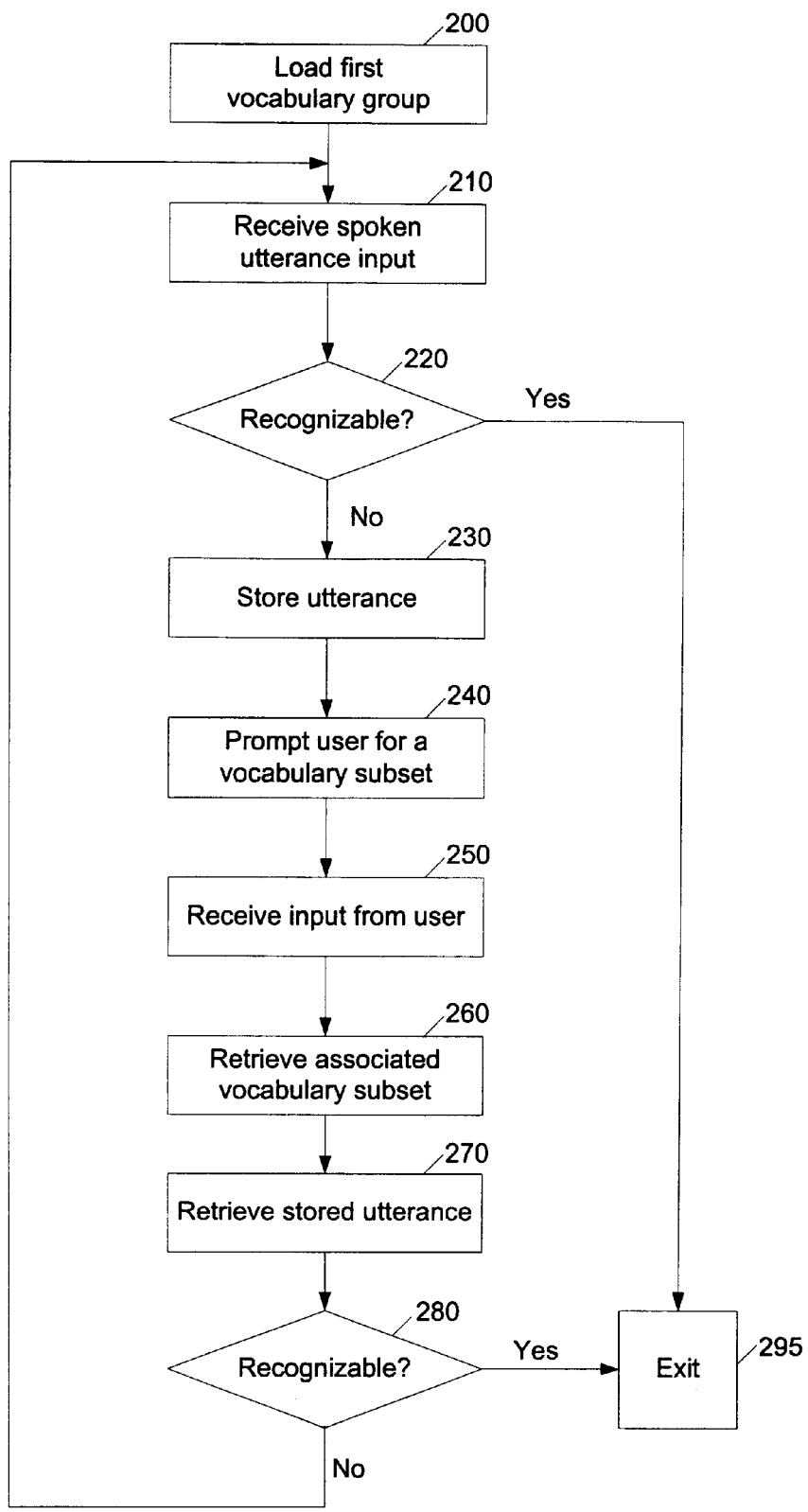
FIG. 3 shows a flow chart of an exemplary speech recognition method in accordance with the present invention.

The present invention provides multiple processing stages with different vocabulary databases, responsive to user input, to improve processing time, efficiency, and accuracy. The entire vocabulary is divided into smaller vocabulary sets, which are associated with particular keywords. FIG. 3 shows a flow chart of an exemplary speech recognition method in accordance with the present invention. At step 200, a vocabulary set is activated. The vocabulary set is a subset of the entire vocabulary (e.g., the 5000 most commonly used words of a 100,000 word vocabulary) and can be previously determined and stored, or can be constructed when needed, in real-time. In other words, a subset of the entire vocabulary is extracted and stored ahead of time, before it is needed, or it can be determined in real-time based on certain parameters, such as the calling party's locality. The actual number of orthographies selected and stored in a particular vocabulary subset depends essentially on processor throughput, as well as the memory size. The faster the processor, the larger the number of the orthographies the vocabulary subset can have.

The system prompts the user to provide input information, such as the name of a business or individual whose phone number is requested, in the form of a spoke utterance. At step 210, the spoken utterance is received by the system, and, if valid speech is detected, it is then determined if the utterance is recognizable, at step 220. If the utterance matches one of the entries in the small vocabulary set (using a compare and score technique, and comparing the highest score to a predetermined threshold, as would be understood by one skilled in the art), then the utterance is considered to be recognizable, and the process exits with the recognized entry at step 295. In essence, if the probability of the determined entry being a correct mapping to the spoken utterance exceeds a certain threshold, the entry is accepted. Otherwise, it is rejected.

The initial comparison (i.e., steps 200–220) allows the system to compare orthographies that are most likely to constitute a match to the spoken utterance. The digital representations generated for the input utterance are compared with the system's stored models for the recognition vocabulary. Comparison with a small subset that has been determined to contain the most likely orthographies results in a less complex calculation that improves the performance and speed of the system. The matching process is aided by statistical models and efficient search algorithms, such as those embedded in the hidden Markov models.

At step 230, if the utterance is not recognizable when compared to the small vocabulary set, then the utterance (more specifically, the signals representing the utterance) is stored for later use, in a storage memory. The user is then prompted, at step 240, for a keyword in which the subset of words in which his initial utterance may be found. For example, the user may be prompted to say "restaurant", "hotel", "stock quote", "horoscope" or "other". The user's input is received at step 250.

At step 260, a predetermined vocabulary subset associated with the received keyword (e.g., "restaurant") is loaded from memory into the system. Alternatively, a vocabulary subset can be generated in real-time, to reduce the likelihood of using outdated data (e.g., names of restaurants). The stored utterance is then retrieved at step 270 and compared to the newly loaded vocabulary subset at step 280 (using a compare and score technique, and comparing the highest score to a predetermined threshold, as would be understood by one skilled in the art). If the utterance matches one of the entries in the newly loaded vocabulary subset, then the utterance is recognizable, and the process exits with the recognized entry at step 295. In other words, the stored model that produces the best match (i.e., highest score) and has a score above the predetermined threshold is determined, at which point the spoken word is considered recognized. After the orthography has been recognized, processing continues with the recognized othography providing a link into an entry into another database (not shown), for example. Otherwise, it is determined that the initial utterance was unrecognizable, and the user is prompted to repeat the initial utterance, with processing returning to step 210. It is also contemplated that instead of returning to step 210, the user would be connected to a human operator who would then process the user's request.

Because the user indicated the vocabulary subset from which to perform the second comparison (i.e., step 280), the number of candidate orthographies for which computation must be performed has been greatly reduced to just the orthographies in the subset identified by the user. This provides for less complex calculations and a faster determination time. Moreover, the scoring threshold can be decreased because there is an increased likelihood that the user's spoken utterance is within the subset, because the subset has also been identified by the user.

Figure 4:
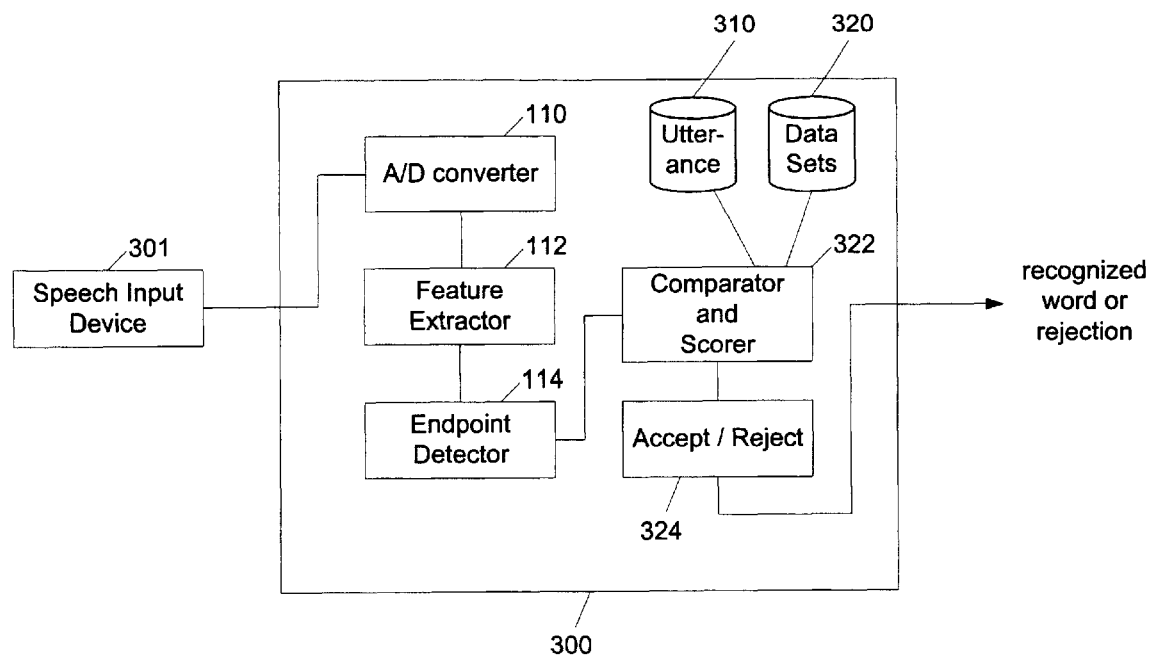
FIG. 4 shows a block diagram of an exemplary speech recognition system in accordance with the present invention.

An exemplary system that can implement the method in accordance with the present invention is shown in FIG. 4. FIG. 4 contains elements similar to those described above with respect to FIG. 2. These elements are labeled identically and their description is omitted for brevity. It is contemplated that the speech input device 301 can be any type of device that accepts speech input, such as a microphone or telephone set, such as a plain old telephone set, a handheld device that accepts speech and may also display graphics, or a WAP-enabled phone. An utterance memory 310 is provided, preferably coupled to the comparator and scorer 322, for storing the input spoken utterance if it is not recognized by the first comparison pass described above (i.e., steps 200–220). The various vocabulary subsets are stored in a database or other storage device 320. The comparator and scorer 322 accesses the appropriate vocabulary subset from storage 320. The comparator and scorer 322 preferably comprises a microprocessor. An accept/reject determiner 324 is coupled to the comparator and scorer 322 for determining if the utterance is to be accepted (recognized) or rejected (not recognized).

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A method of speech recognition comprising:

receiving a spoken utterance by a user;

providing a vocabulary word storage memory comprising a first set of orthographies potentially recognizable as the spoken utterance, wherein the first set of orthographies comprises a first subset of an entire vocabulary comprising orthographies predetermined to have a high probability of matching the spoken utterance;

providing a spoken utterance storage memory for storing the spoken utterance;

processing the spoken utterance to determine whether one of the orthographies stored in the first set corresponds to the spoken utterance, thereby indicating a recognized word;

prompting the user for a keyword input if none of the orthographies in the first set corresponds to the spoken utterance, wherein the keyword input designates one of a plurality of second sets of orthographies potentially recognizable as the spoken utterance, wherein each second set comprises a predetermined subset of the entire vocabulary;

receiving the keyword input;

comparing the keyword input to the first set of orthographies to determine the second set of orthographies; and determining whether one of the orthographies stored in the second set corresponds to the spoken utterance, thereby indicating a recognized word.

2. The method according to claim 1, further comprising prompting the user for another spoken utterance if none of the orthographies in the plurality of second sets corresponds to the spoken utterance.

3. The method according to claim 1, further comprising providing a plurality of subsets of orthographies potentially recognizable as the spoken utterance to the vocabulary word storage memory.

4. The method according to claim 1, further comprising prompting the user for another spoken utterance if none of the orthographies in the determined second set corresponds to the spoken utterance.

5. The method according to claim 1, further comprising:

comparing the spoken utterance to each orthography in the first set or one of the plurality of second sets to generate a score;

determining the orthography having the highest score; and determining if the highest score is at least equal to a predetermined threshold to determine whether one of the orthographies stored in the first set or in one of the plurality of second sets corresponds to the spoken utterance.

6. The method according to claim 5, wherein the orthography corresponding to the highest score and having a score at least equal to a predetermined threshold is determined to be the recognized word.

7. The method according to claim 6, further comprising providing the recognized word to another program as input.

8. The method according to claim 1, further comprising determining the first set of orthographies potentially recognizable as the spoken utterance based on a calling locality of the user.

9. A speech recognition system comprising:

an input for receiving a spoken utterance by a user;

a vocabulary word storage memory comprising a first set of orthographies and a second set of orthographies, wherein the first set of orthographies is predetermined to have a high probability of matching the spoken utterance and the plurality of second sets of orthographies each comprise a predetermined subset of an entire vocabulary, which is potentially recognizable as the spoken utterance;

a spoken utterance storage memory for storing the spoken utterance;

a processor in operative relationship with the vocabulary word storage memory and the spoken utterance storage memory for processing the spoken utterance to determine whether one of the orthographies stored in the first set corresponds to the spoken utterance, thereby indicating a recognized word; and a prompt generator for prompting the user for a keyword input, wherein the keyword input designates one of the plurality of second sets that contains the spoken utterance, if none of the orthographies in the first set corresponds to the spoken utterance;

wherein the processor is adapted to compare the keyword input to the first set to determine a one of the second sets of orthographies; and wherein the processor is further adapted to determine whether one of the orthographies stored in the second set corresponds to the spoken utterance, thereby indicating a recognized word.

10. The system according to claim 9, wherein the prompt generator is adapted to prompt the user for another spoken utterance if none of the orthographies in the second set of orthographies corresponds to the spoken utterance.

11. The system according to claim 9, wherein the processor is adapted to compare the spoken utterance to each orthography in the first or second set to generate a score, determine the orthography providing the highest score, and determine if the highest score is at least equal to a predetermined threshold to determine whether one of the orthographies stored in the first or second set corresponds to the spoken utterance.

12. The system according to claim 11, wherein the orthography corresponding to the highest score and having a score at least equal to a predetermined threshold is determined to be the recognized word.

13. The system according to claim 9, wherein the processor is adapted to provide the recognized word as an input to a program.

14. The system according to claim 9, wherein the first set of orthographies potentially recognizable as the spoken utterance is determined based on a calling locality of the user.

15. The system according to claim 9, wherein the prompt generator is adapted to prompt the user for another spoken utterance if none of the orthographies in the second set of orthographies corresponds to the spoken utterance.

16. The system according to claim 9, wherein the vocabulary word storage memory comprises a plurality of predetermined subsets of orthographies potentially recognizable as the spoken utterance.

* * * * *

UNITED STATES PATENT AND TRADEMARK OFFICE
CERTIFICATE OF CORRECTION

PATENT NO.    : 6,751,595 B2
DATED         : June 15, 2004
INVENTOR(S)   : Senis Busayapongchai et al.

It is certified that error appears in the above-identified patent and that said Letters Patent is hereby corrected as shown below:

Column 6,
Line 31, "a one of the second" should read -- one of the second --

Signed and Sealed this

Third Day of August, 2004

JON W. DUDAS
*Acting Director of the United States Patent and Trademark Office*